(12) United States Patent
Yoshida

(10) Patent No.: US 7,224,476 B2
(45) Date of Patent: *May 29, 2007

(54) CONTROL DEVICE AND CONTROL METHOD FOR NETWORK-CONNECTED DEVICE

(75) Inventor: Eiichi Yoshida, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 801 days.

(21) Appl. No.: 09/151,321

(22) Filed: Sep. 11, 1998

(65) Prior Publication Data

US 2002/0018226 A1    Feb. 14, 2002

(30) Foreign Application Priority Data

Sep. 11, 1997    (JP)    ................................. 9-246443

(51) Int. Cl.
*G06F 3/12*    (2006.01)
*G06F 13/00*    (2006.01)
(52) U.S. Cl. .................... 358/1.14; 358/1.13; 358/1.15
(58) Field of Classification Search ............... 358/1.15, 358/1.13, 1.14
See application file for complete search history.

(56) References Cited

U.S. PATENT DOCUMENTS

| 5,467,434 | A | * | 11/1995 | Hower, Jr. et al. | ......... 395/114 |
| 5,768,483 | A | * | 6/1998 | Maniwa et al. | ............. 395/114 |
| 5,800,081 | A | * | 9/1998 | Teradaira et al. | ............. 400/74 |
| 6,088,120 | A | * | 7/2000 | Shibusawa et al. | ......... 358/1.15 |

FOREIGN PATENT DOCUMENTS

| JP | 5-284265 | 10/1993 | |
| JP | 7-152519 | 6/1995 | |
| JP | 7-288620 | 10/1995 | |
| JP | 7-288622 | 10/1995 | .................... 11/11 |
| JP | 7-295768 | 11/1995 | |
| JP | 8-335149 A | 12/1996 | |
| JP | 3337871 B2 | 8/2002 | |

* cited by examiner

*Primary Examiner*—Gabriel Garcia
*Assistant Examiner*—Douglas Tran
(74) *Attorney, Agent, or Firm*—Sidley Austin LLP

(57) ABSTRACT

A system for selecting a network-connected image forming apparatus wherein there are provided a plurality of network-connected image forming apparatuses and job registration means which distributes and registers a job in an image forming apparatus via a network, wherein the job registration means registers a specific mode job in an image forming apparatus already storing another specific mode job.

19 Claims, 6 Drawing Sheets

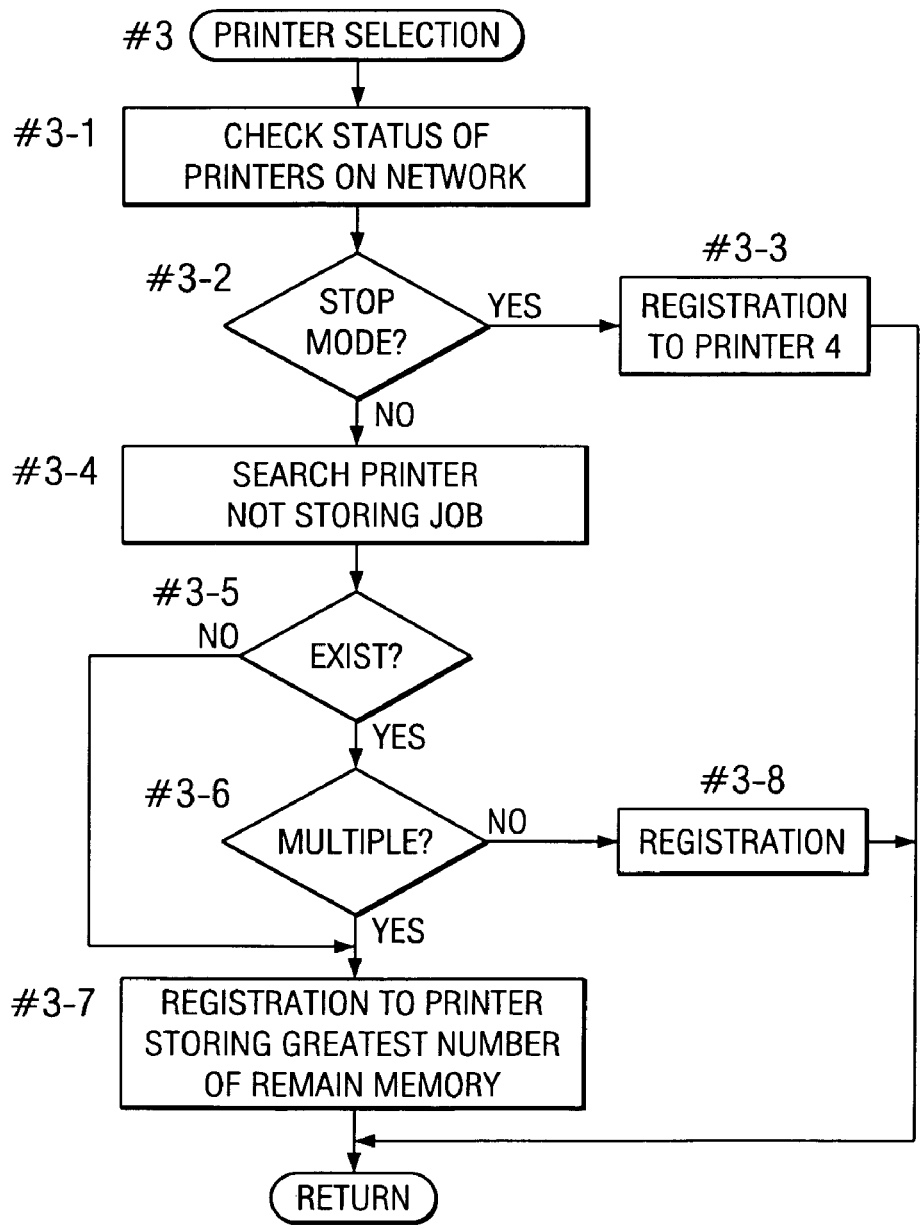

CONTROL DEVICE AND CONTROL METHOD FOR NETWORK-CONNECTED DEVICE

RELATED APPLICATIONS

This application is based on application No. HEI 9-246443 filed in Japan, the content of which is hereby incorporated by reference.

BACKGROUND OF THE INVENTION

1. Field of the Invention

The present invention concerns a device and a method for selecting an image forming apparatus when, in an instance in which a plurality of printers, copiers, or other such image forming apparatuses are connected to a network, a job registration means distributes a job requested by a computer or other such device to an individual image forming apparatus and registers said job therein. The present invention particularly concerns a method for selecting an image forming apparatus in an instance wherein a job of a specific mode that impedes continuous job execution is registered.

2. Description of the Related Art

A conventionally known network system is one in which a plurality of image forming apparatuses is connected to a network and any of such devices is selected over the network to execute an image forming job. In such an instance, when a job requested by a computer or the like is registered for intended execution by a randomly selected image forming apparatus, if the aforementioned image forming apparatus is unable to execute the aforementioned job, an error is generated and overall system efficiency suffers.

Consequently, methods previously proposed to select an image forming apparatus when a job is distributed to an individual image forming apparatus include a method which recognizes the functional restrictions of individual image forming apparatuses and selects an image forming apparatus able to execute the requested job, and a method which searches for an image forming apparatus equipped with a printing medium requested by the job and selects an applicable device.

Depending on the type of job, a need sometimes arises to stop an image forming apparatus temporarily. For example, when printing in a manual paper supply mode, not only standard sheets, but non-standard sheets or special sheets (such as thick sheets or OHP sheets) are sometimes used. In some cases each user also commonly changes the sheets, and it is not possible to make a definitive determination about the sheets used. For this purpose, in a manual paper supply mode, an image forming apparatus is generally stopped temporarily in order to exchange sheets, and the user is requested to exchange the sheets in the manual paper supply port. In an image forming apparatus capable of storing multiple jobs, a disadvantage arises in that, when operation is stopped to exchange sheets, the execution of stored jobs is subsequently delayed, leading to reduced efficiency.

Because the aforementioned conventional selection methods merely select an image forming apparatus capable of executing a requested job, stop mode jobs and jobs pertaining to other modes are at times stored in intermingled fashion in a selected image forming apparatus, and the aforementioned problem has as yet not been resolved.

Another solution devised for the aforementioned problem is to exercise control such that, when an image forming apparatus is halted temporarily and a job pertaining to a mode not requiring a stop is next stored, such a job is executed prior to the aforementioned stop mode job. In this instance, a new problem results in that, when several non-stop mode jobs are stored, these jobs successively preempt the stop mode job and are executed continuously, and timing to restart the stop mode job cannot be achieved.

SUMMARY OF THE INVENTION

The present invention was conceived in view of the aforesaid technical background; an object of the present invention is to provide a method for selecting a network-connected image forming apparatus such that individual jobs are executed efficiently even when jobs transported over the network include those pertaining to a specific mode such as a stop mode.

The aforementioned object is achieved by a method for selecting a network-connected image forming apparatus wherein there are provided a plurality of network-connected image forming apparatuses and at least one job registration means which distributes and registers a job in an aforementioned image forming apparatus via a network; each of the aforementioned image forming apparatuses is capable of storing multiple jobs and of executing a specific mode job; the aforementioned job registration means distinguishes the mode of a job sent to an aforementioned image forming apparatus; and if said mode is a specific mode, an aforementioned image forming apparatus in which such a specific mode job has already been stored is referenced over a network, and the aforementioned specific mode job is registered in said image forming apparatus.

Through this method, a job pertaining to a specific mode (termed a "specific mode job" hereinafter) that impedes continuous job execution is registered in an image forming apparatus in which a job pertaining to that specific mode has already been stored, and specific mode jobs are thereby accumulated in a specific image forming apparatus for storage and execution. Intermingled storage of specific mode jobs and other jobs is thus prevented, execution of a job other than a specific mode job is no longer delayed in order to execute a specific mode job, and a decline in the overall processing efficiency of a network is prevented.

An example of a specific mode job is a job requiring temporary stoppage of an image forming apparatus; specifically, a job possessing a manual paper supply mode or a job possessing a mode requiring exchange of a paper supply cassette.

It is also preferable that a job registration means does not register an aforementioned job other than a specific mode job in the aforementioned image forming apparatus which stores an aforementioned specific mode job. By registering jobs other than specific mode jobs in an image forming apparatus other than an image forming apparatus storing a specific mode, such a structure distinguishes individual image forming apparatuses reliably according to their application.

When an image forming apparatus storing a specific mode job cannot be referenced, the job registration means preferably registers an aforementioned specific mode job in an image forming apparatus in which a job has not been stored. This structure affords smooth determination of the image forming apparatus which is to execute an initial job possessing a specific mode and also affords smooth registration of subsequent jobs. In this instance, an aforementioned specific mode job should not be registered in at least one aforementioned image forming apparatus. At least one image forming apparatus which executes jobs other than specific mode jobs is thereby reserved, which obviates a risk that a specific mode job will be misinterpreted and registered in all image forming apparatuses.

The job registration means also receives information from an aforementioned image forming apparatus regarding the size of paper attached to the aforementioned image forming apparatus and determines from the aforementioned paper size information whether or not a job sent to the aforementioned image forming apparatus can be executed using the attached paper. When a determination is made that execution is not possible, the aforementioned image forming apparatus storing aforementioned a specific mode job should be referenced, and said job should be registered in said image forming apparatus. By means of this structure, when a specific size paper is not present at any image forming apparatus, a specific mode job using such paper is registered in an image forming apparatus which executes specific mode jobs, said job is handled in like fashion to a manual paper supply mode or other temporary stop mode, and efficiency is further improved.

Another acceptable means to solve the aforementioned problems is the adoption of a method for selecting a network-connected image forming apparatus wherein, a plurality of network-connected image forming apparatuses and at least one job registration means which distributes a job to the aforementioned image forming apparatuses over a network are provided; each of the aforementioned image forming apparatuses is capable of executing a specific mode and storing multiple jobs; the aforementioned job registration means distinguishes the mode of a job sent to an aforementioned image forming apparatus; and when said mode is a specific mode, said job is registered in a previously determined image forming apparatus.

In this instance, it is no longer necessary for the job registration means to make reference over the network to an image forming apparatus already storing a specific mode job, and the selection operation is thereby simplified.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 9 is a flowchart illustrating other selection processing for a printer which is to register a specific mode job.

DESCRIPTION OF THE PREFERRED EMBODIMENTS

Figure 1:
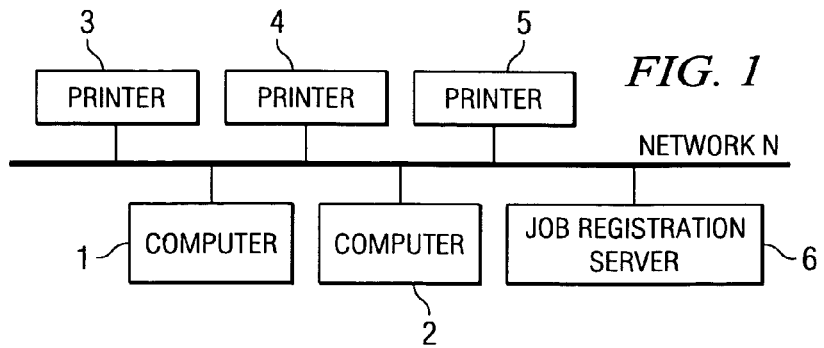
FIG. 1 is a block diagram illustrating a network structure example.

FIG. 1 illustrates a network connection example which serves to describe a preferred embodiment of the present invention.

Network N comprises a plurality of computers 1 and 2 which request printing processing in the form of a job; a plurality of printers 3 through 5 serving as image forming apparatuses which execute said job; and job registration server 6 which distributes an aforementioned job requested from computers 1 and 2 to individual printers 3 through 5 and registers said job.

The aforementioned computers 1 and 2 prepare printing data and issue one job to job registration server 6. Job registration server 6 assesses the printing data and determines whether each printer is suitable for job execution. The job is then registered with the designated printer.

In lieu of computers 1 and 2, a scanner which scans an original document and generates image data may also be connected to network N, and a request for an original document copying job may be made to job registration server 6.

Each of the aforementioned printers 3 through 5 is set up to store multiple jobs to the extent that internal memory capacity allows. Stored jobs are executed sequentially in the order of storage.

The present preferred embodiment is devised such that the sequence of jobs stored in individual printers 3 through 5 is not rearranged, and a subsequent job is not executed ahead of a previous job.

Figure 3:
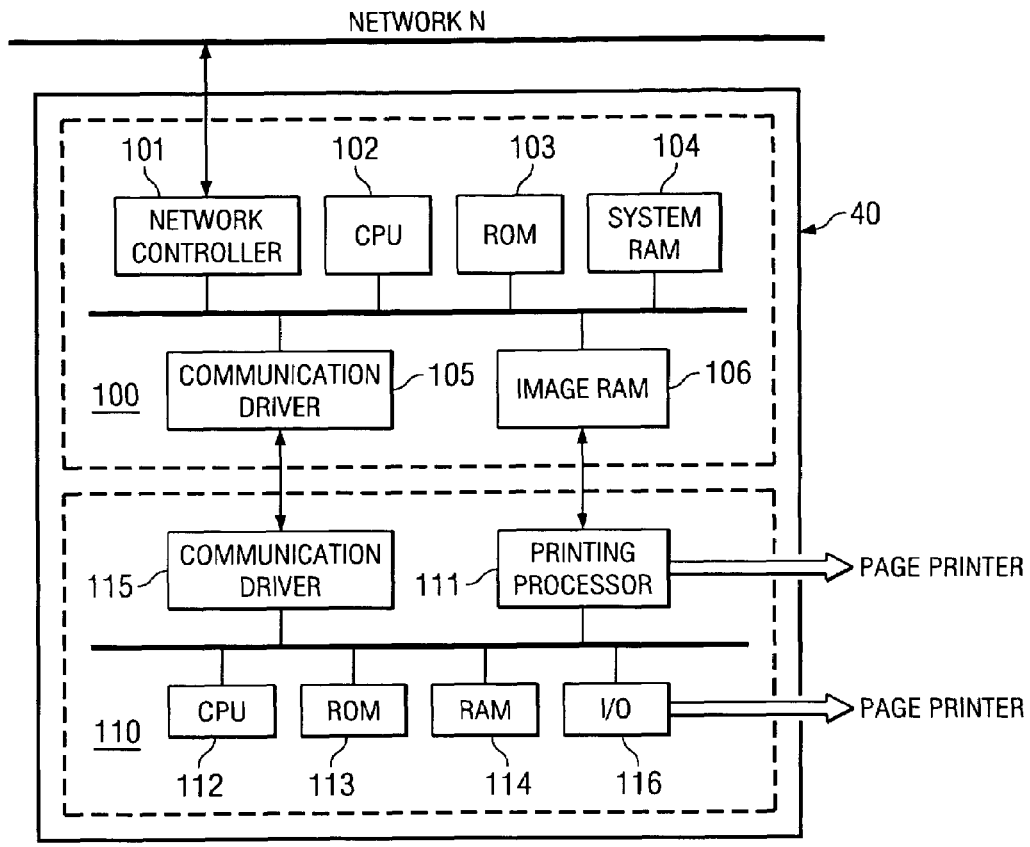
FIG. 3 is a block drawing illustrating the structure of a printing controller pertaining to the printer in FIG. 2.

FIG. 3 is a cross-sectional view which diagrammatically illustrates an example of printer 3 and the overall structure thereof.

Printer 3 comprises printing controller 40 which outputs an exposure control signal and page printer unit PRT which performs a printing operation. Page printer unit PRT comprises developing/transfer system 70A comprising print head 60 for which semiconductor laser 62 forms a light source, and photosensitive drum 71 and peripheral devices thereto; fixing/ejection system 70B possessing components including fixing rollers 84 and ejection rollers 85; and recirculating paper transport system 70C including paper resupply unit 600. Page printer unit PRT uses an electrophotographic process to print a copy image based on image data transferred from job registration server 6. At the lower region of printer 3 are provided two paper cassettes 80a and 80b able to store several hundred sheets of paper, sheet sensors SE11 and 12, and a roller group used for paper supply. Paper supplied manually is placed at manual paper supply port 80c. Sensor SE13 detects whether a sheet has been placed, as well as the size of a placed sheet. Manual paper supply port 80c is used when a job for printer 3 entails a manual paper supply mode. In the present device, OHP sheets, thick sheets, or special sheets such as non-standard size sheets are placed in manual paper supply port 80c for printing.

Paper cassettes 80a and 80b have a structure only allowing placement of A4, B4, or other standard sheets, and manual paper supply port 80c has a structure allowing placement of non-standard sheets as well as standard sheets.

Printing data received by the aforementioned printer 3 is developed into image data by printing controller 40, converted into a laser drive signal, and sent to semiconductor laser 62. A laser beam emitted from semiconductor laser 62 is modified in a main scan direction by polygon mirror 65 and directed via main lens 69 and mirrors 67a, 68, and 67c to the imaging position of photosensitive drum 71. The surface of photosensitive drum 71 is charged uniformly by electrostatic charger 72. A latent image formed by exposure travels via developer 73 and becomes a toner image, and said toner image is transferred onto a sheet by transfer charger 74 at a transfer position (copy position). The sheet is then separated from photosensitive drum 71 by separation charger 75, transported to fixing rollers 84 by transport belt 83, and ejected face-up.

FIG. 3 is a block diagram illustrating the structure of the aforementioned printing controller 40.

Printing controller 40 comprises image controller 100 which prepares image data for an image based on both a printing request received over network N and on printing data, and printer control unit 110 which controls page printer unit PRT such that image data prepared by image controller 100 is actually formed on a sheet.

CPU 102 controls the aforementioned image controller 100 according to a program stored in ROM 103. Image controller 100 is connected to network N, and handshaking with other devices is performed via network controller 101.

Data for printing sent via network N (page description language) is stored in system RAM 104. Said data is analyzed in image controller 100 and a graphic image is developed in image RAM 106 based on an image drawing algorithm.

The bitmapped graphic image developed in image RAM 106 is sent to printing processor 111 in printer control unit 110 as a video signal.

CPU 112 controls printer control unit 110 according to a program stored in ROM 113. The aforementioned video signal received from image RAM 106 is converted to a laser drive signal by printing processor 111 and sent to page printer unit PRT. Printer control unit 110 carries out the sheet transport control and developing and image-production control required for control of page printer unit PRT. I/O port 116 of printer control unit 110 is connected to a motor, driver, or sensor, etc. in page printer unit PRT, allowing page printer unit PRT to be driven. The details of printer control are not directly related to the present invention are therefore omitted here.

Printing controller 40 can continue to receive jobs as long as there is free capacity in system RAM 104, and with each job, received job data is stored in system RAM 104.

Figure 4:
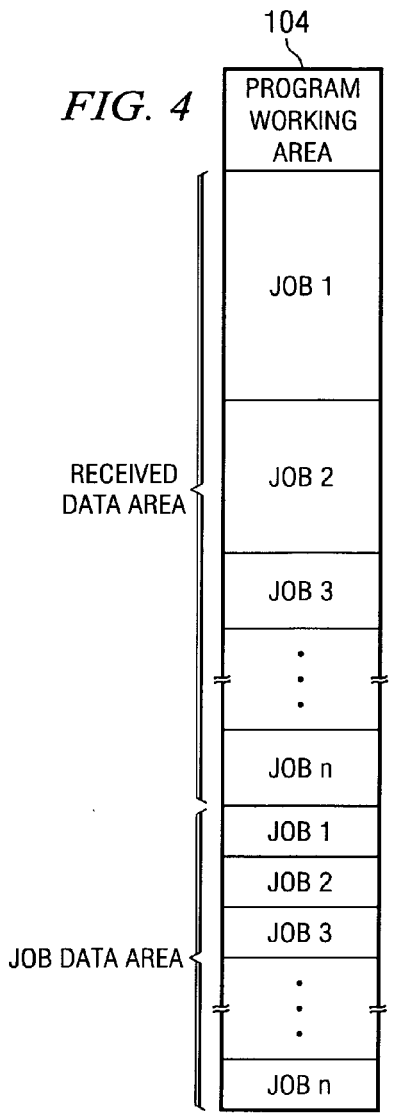
FIG. 4 is a structural drawing of usage within the system RAM in the printing controller pertaining to FIG. 3.

FIG. 4 illustrates the structure within system RAM 104. The interior of system RAM 104 comprises program working area A which stores data required when a program is run, received data area B which stores data received over a network, and job data area C which stores job data. Data in received data area B is processed in job units in the order of storage. Received data is stored as page description language data like that described above.

Said page description language data comprises drawing commands required for drawing an image and control commands which designate sheet selection and the like. A graphic image rather than drawing commands can also be received directly.

When job registration server 6 registers a job, the job is registered once the mode of said job (e.g., a manual paper supply mode requiring temporary stoppage of a printer) is designated, and such information is registered as individual job data in job data area C. Job execution status such as "currently printing" or another status is also determined at the printer and included in the aforementioned registration. When job registration server 6 requests job data, the contents of job data area C are referenced and made known to job registration server 6.

The present preferred embodiment assumes that when the initial mode included in a job is a manual paper supply mode, a printer must be stopped once and a user must exchange the sheets in manual paper supply port 80c. It is also assumed that when computer 1 or 2 has designated a sheet size and the relevant size is not present, a user is requested to place the relevant size sheet in manual paper supply port 80c. Such a manual paper supply mode comprises a stop mode.

The reason for the former assumption is that it is not possible to make a determination as specific as the quality of a sheet that a user has placed in manual paper supply port 80c. For example, once a user initially using manual paper supply port 80c has carried out printing using an OHP sheet, the next user seeking to use manual paper supply port 80c may wish to print using thick regular paper. Because manual paper supply port 80c is normally used when one wishes to print on special paper, there is a very high possibility that a first user and the next user will use different types of paper. Sensor SE13 in manual paper supply port 80c can nevertheless detect only the placement of a sheet and the size of a sheet and cannot make a detection as specific as the quality of a sheet. Printing designations such as "printing on thick paper" or "printing on OHP sheets" detailing the type of sheet are also not made, and consequently, no determination can be made as to whether an anticipated sheet has been correctly placed in manual paper supply port 80c.

Nevertheless, when the job of an initial user and the job of the next user are printed continuously from manual paper supply port 80c in similar fashion, it will ultimately become impossible to print on the type of sheet desired by a user. The present device is therefore devised such that when a job ends and manual paper supply mode has been selected initially, printers 3 through 5 are temporarily stopped, and a user is instructed to place a desired sheet in manual paper supply port 80c. Instruction is carried out by sending a message over the network to computer 1 or 2 which made the request.

The reason for the latter assumption is that paper cassettes 80a and 80b have a structure not allowing the placement of non-standard size sheets, and therefore when an appropriate size sheet is not present, a user is instructed to place a sheet of the size concerned in manual paper supply port 80c.

Figure 5:
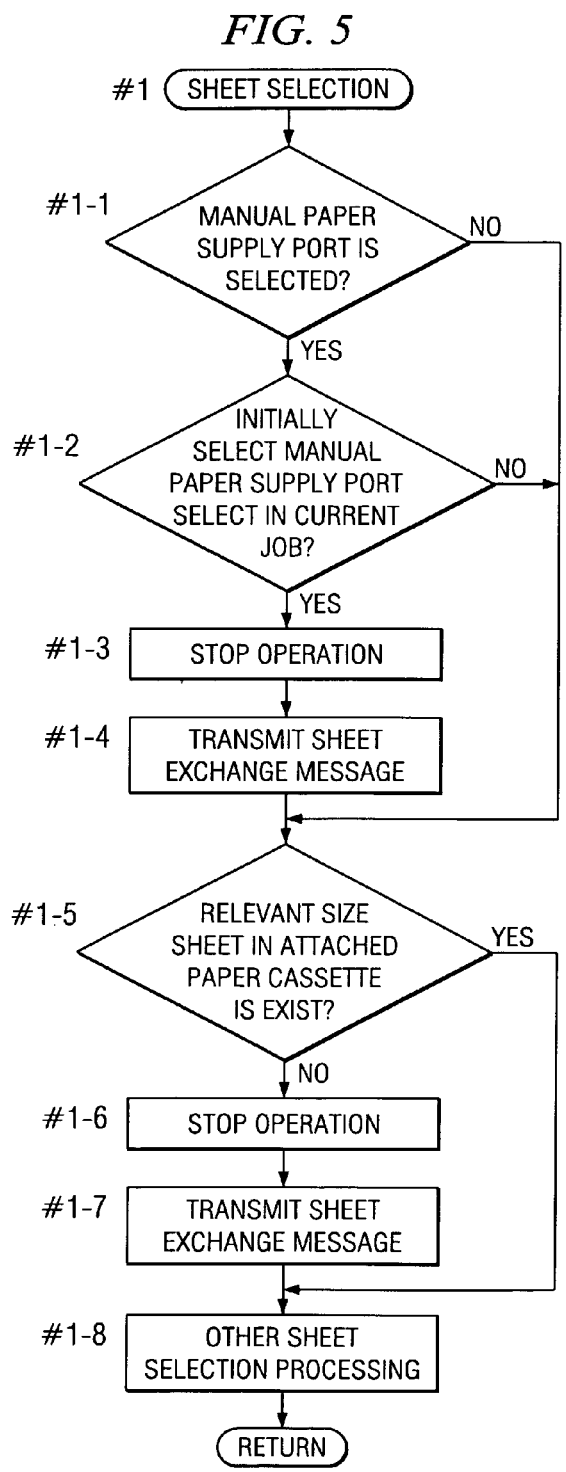
FIG. 5 is a flowchart illustrating sheet selection processing.

The foregoing processing is next described with reference to the flow chart illustrated in FIG. 5.

In sheet selection, the selection status of manual paper supply port 80c is determined (#1-1). If selected (Yes), a check determines whether manual paper supply port 80c was initially selected in the current job (#1-2). If initial selection has occurred (Yes), printer operation is stopped (#1-3), and network controller 101 transmits a sheet exchange message over network N to the requesting computer 1 or 2 (#1-4).

When a sheet designation is made at the time of printing, a check determines whether a relevant size sheet is present in attached paper cassettes 80a and 80b (#1-5). If a relevant size sheet is not present (No), printer operation is stopped (#1-6), and a message requesting that a sheet be placed in manual paper supply port 80c is transmitted to the requesting computer 1 or 2 (#1-7). Other sheet selection processing is then executed (#1-8). Said other sheet selection processing is executed even if a relevant size sheet is present (Yes at #1-5). Thus, in the present preferred embodiment, manual paper supply automatically results in a stop mode even if a sheet of a designated size is not present within attached paper cassettes 80a and 80b, and efficiency is good.

Figure 6:
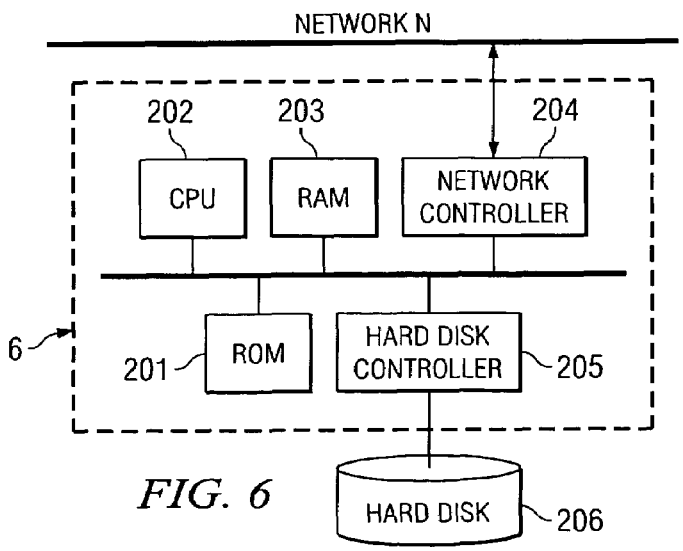
FIG. 6 is a block diagram illustrating the structure of a job registration server.

FIG. 6 is a block diagram of job registration server 6 which registers a job.

CPU 202 controls job registration server 6 according to a program stored in ROM 201. RAM 203 stores parameters and other information needed when a program is run. Connection to network N is through network controller 204 as in the case of printers 3 through 5. Job data received from computers 1 and 2 over network N travels via hard disk controller 205 and is recorded on hard disk 206. Page description language used for printing is recorded on hard disk 206, and job registration server 6 examines this content and ascertains the type of sheet selection for which control commands are included.

Job registration server 6 also ascertains printer status and information regarding jobs registered in printers 3 through 5 connected to network N, and job registration server 6 handles processing to select an appropriate printer based on stored jobs and printer status.

Figure 7:
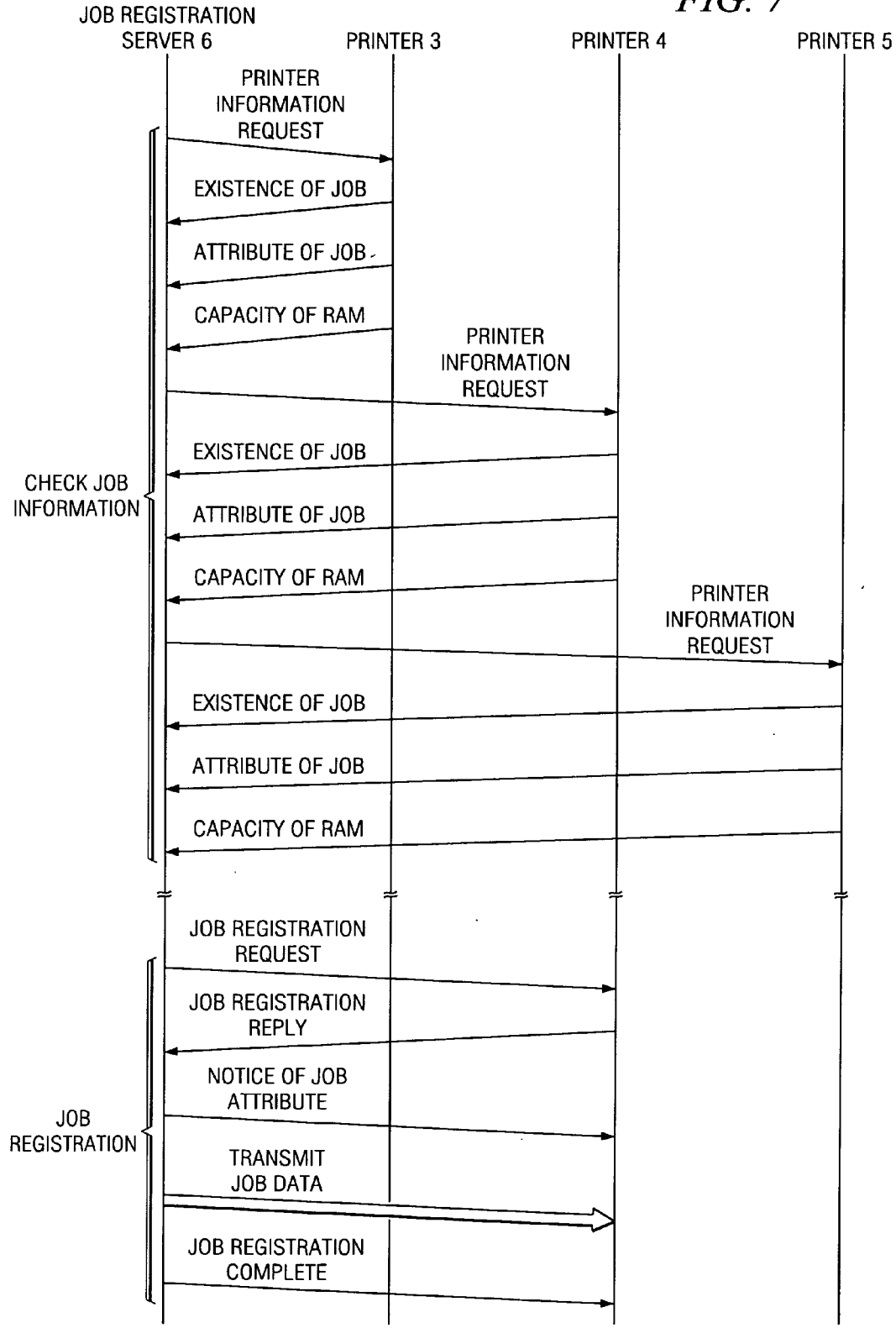
FIG. 7 is a drawing illustrating information acquisition and job registration procedures pertaining to printers.

FIG. 7 is a drawing illustrating handshaking procedures at the time job registration server 6 registers a job. Job registration server 6 requests that printers 3 through 5 connected to network N send information. Printers 3 through 5 are asked whether they are currently storing a job (if not, a printer is not operating), and if so, said printers return "attributes for all stored jobs" and "free system RAM 104 capacity" to job registration server 6 which issued the request. Job registration server 6 performs this processing for each of printers 3 through 5 connected to network N.

When a job is actually registered, a "job registration request" is issued to, for example, printer 4 selected by job registration server 6, and if printer 4 is able to accept this request, said printer returns a "job registration reply" to job registration server 6. The attributes of a job that job registration server 6 intends to register reveal whether said job is one incorporating a stop mode. Printer 4 stores this information in job data area C of system RAM 104.

Actual job data (page description language) is then transmitted to printer 4, and when transmission ends, a "job registration complete" message is sent to printer 4. The handshaking protocol is not directly relevant, and a description is therefore omitted.

Figure 8:
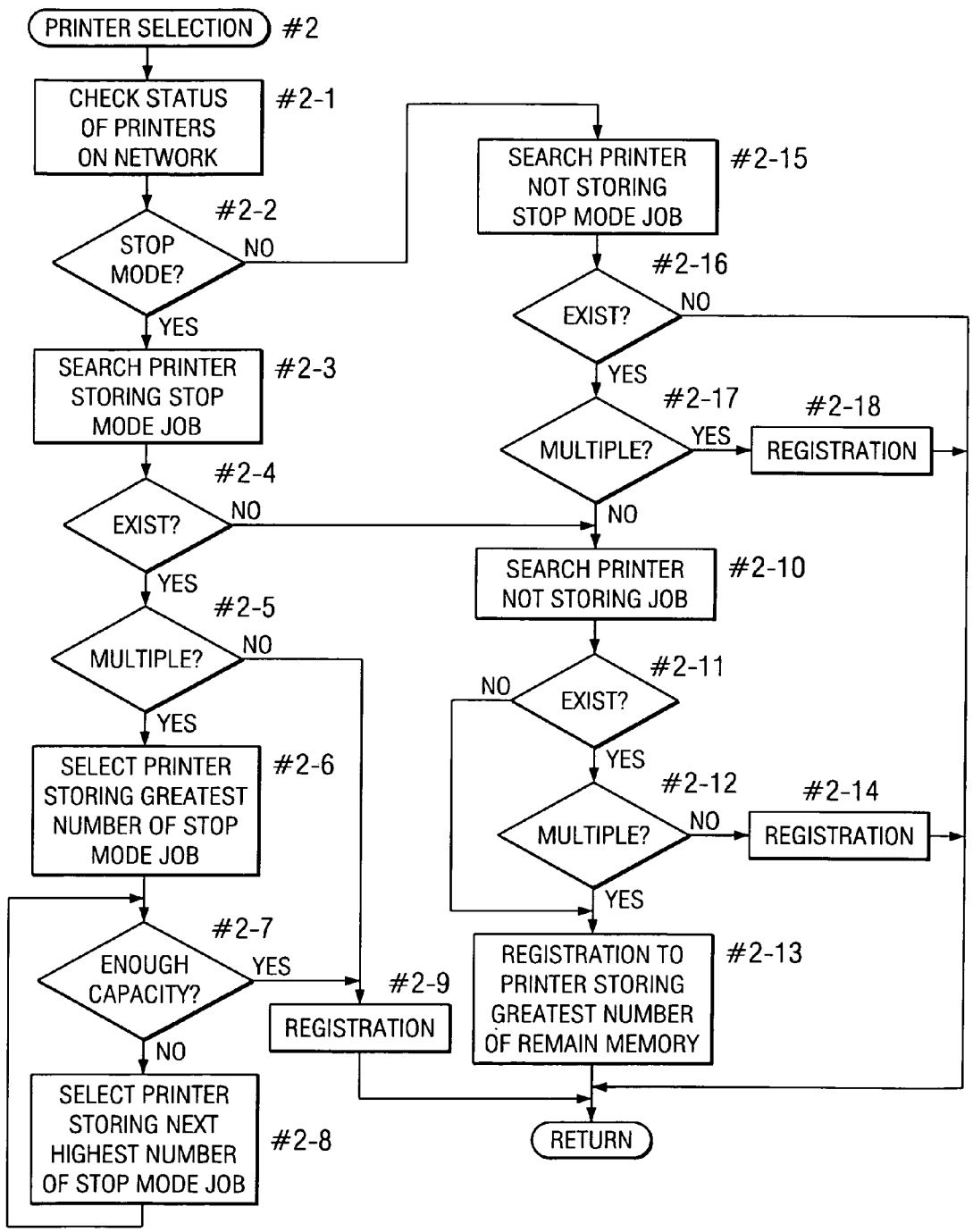
FIG. 8 is a flowchart illustrating selection processing for a printer which is to register a specific mode job.

FIG. 8 is a flowchart illustrating selection processing pertaining to printers 3 through 5 which register jobs.

Information pertaining to printers 3 through 5 connected to network N is first acquired (#2-1). Job registration server 6 sends a packet requesting information to individual printers 3 through 5 and acquires information from individual printers 3 through 5 (FIG. 7, above). The mode of the job to be registered is next determined from page description language recorded on hard disk 206, and a check determines whether said mode is a stop mode requiring temporary stoppage of a printer (#2-2). If said mode is a stop mode (Yes), previously received printer data is used to search for a printer 3 through 5 storing an identical stop mode job (#2-3). If there is such a printer (Yes at #2-4) and there is only one such printer, the job is registered in that printer (#2-9). If there are multiple such printers, the printer storing the greatest number of stop mode jobs is selected (#2-6). A check then determines whether the remaining RAM capacity of the printer is adequate (#2-7). If adequate (Yes), the job is registered in that printer (#2-9), and if not adequate (No), the printer storing the next highest number of stop mode jobs is selected (#2-8), its remaining RAM capacity is checked, and similar procedures are then repeated.

If there is no printer storing a stop mode job (No at #2-4), a search is made for a printer not storing a job (a non-operating printer) (#2-10). If there is only one such printer, the job is registered in that printer (#2-14), and if there are multiple such printers, the printer with the greatest remaining RAM capacity is selected (#2-13). A printer which is to execute an initial job possessing a stop mode is thus selected. The printer with the greatest remaining RAM capacity is also selected for registration when there is no non-operating printer in which a job is not stored (No at #2-11).

When a job to be registered is a job not including an aforementioned stop mode (No at #2-2), a printer not storing a stop mode job is referenced (#2-15). If there is such a printer and there is only one such printer, said job is registered in that printer (#2-18). If there are multiple such printers (Yes at #2-17), a search is made for a non-operating printer in which a job is not stored, and subsequent processing is identical to an instance in which a job possessing a stop mode is registered (#2-10 through #2-14). A non-stop mode job is thereby registered in a printer separate and distinct from a printer storing a stop mode job, and printer applications are distinguished reliably. If a desired printer is not available (No at #2-16), the sequence ends (repeating until registration is successful).

The foregoing description concerned a method for selecting a printer to register a specific mode job, wherein job data pertaining to a printer connected to network N is collected in job registration server 6 via network N.

Conversely, a preferred embodiment is also acceptable in which a printer intended to execute a specific mode job is previously designated in job registration server 6, and if a subsequent job to be registered is one with an aforementioned stop mode, said job is registered in said printer.

The flowchart in FIG. 9 illustrates such printer selection processing. Registration of a stop mode job in printer 4 is described.

Information pertaining to printers 1 through 3 connected to network N is first acquired (#3-1). Since in this instance printer 4 is designated as the printer to register a stop mode job, acquisition of job attribute information may be eliminated.

The mode of a job to be registered is next recorded on hard disk 206, and a check determines whether this is a stop mode (#3-2). If said mode is a stop mode (Yes), said job is registered in printer 4 (#3-3).

If the job to be registered is a job not incorporating a stop mode (No at #3-2), a search is made among printers 3 through 5 for a non-operating printer in which a job is not stored (#3-4). If there is only one such printer, said job is registered in said printer (#3-8). If there are multiple such printers, the printer with the greatest remaining RAM capacity is selected (#3-7). The printer with the greatest remaining RAM capacity is also selected for registration (#3-7) when there is no non-operating printer in which a job is not stored (No at #3-5). Stop mode jobs are thereby accumulated in printer 4, and non-stop mode jobs can be distributed to printer 3 or printer 5. Due to this method, it is no longer necessary to reference, over a network, a printer storing a stop mode job. Though the foregoing description illustrated an instance in which a stop mode job was registered in one printer, it is also acceptable to designate multiple printers for registration of a stop mode job and to register the aforementioned job in the printer therein with the greatest remaining RAM capacity.

The foregoing preferred embodiment also described job registration server 6 as an independent device on a network, but the function of the job registration server may be incorporated in computer 1 or 2 requesting a job, and the function of the job registration server may also be incorporated in printer 3 or 5. It is acceptable for the function of said server simply to be available in any network-connected device, and there is no restriction on the configuration itself of the devices comprising the network.

There is also no reliance on the handshaking or connection architecture of the network and particularly on the design described in the present preferred embodiment, and a design which allows implementation of the printer selection method is acceptable.

Figure 2:
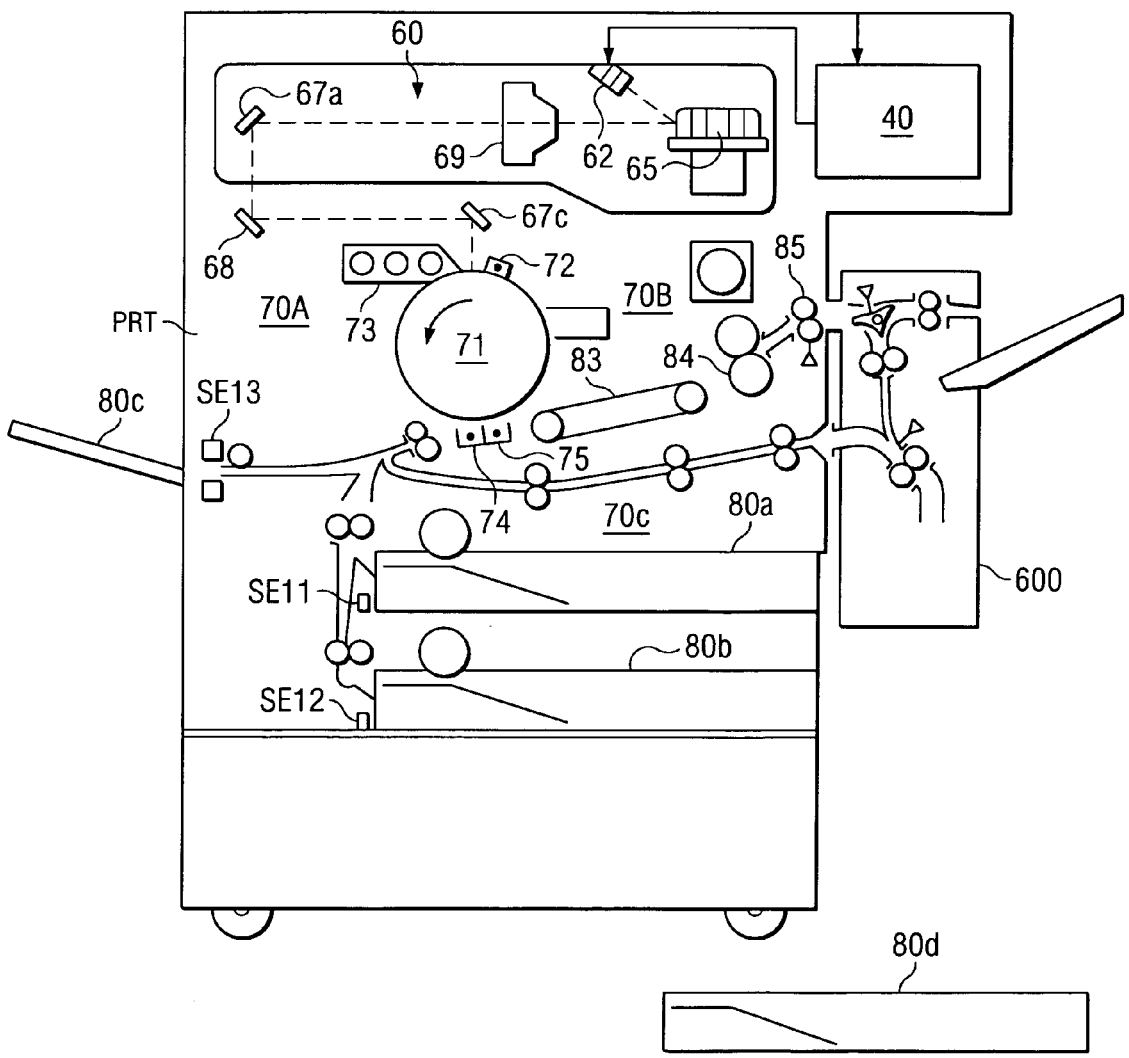
FIG. 2 is a drawing illustrating a simplified structure of a printer serving as an image forming apparatus used in a preferred embodiment pertaining to the present invention.

Though the description of the present preferred embodiment centered around an instance in which a specific mode pertaining to a job was represented by a stop mode comprising a manual paper supply mode, a specific mode is not limited thereto. For example, a specific mode may be a mode established which stops a printer temporarily and provides a message to exchange paper cassettes so that an aforementioned paper supply cassette 80a or 80b can be replaced with another type of paper cassette 80d (illustrated in FIG. 2) detached from a printer to carry out printing in an instance wherein jobs entailing printing on three types of paper, A4, B5, and B4, respectively, have been requested from a printer which only allows attachment of two types of paper cassette 80a and 80b. Another mode which impedes continuous job execution may also represent a specific mode.

The present preferred embodiment also described the use of a printer provided with only a printing function, but such a printer may be provided with a scanner which performs image reading, and an image forming apparatus capable of a copy operation based on data from a scanner as well as data received from a network may also be used, and a device provided with a fax function may also be used.

As described above, the present invention allows jobs of a specific mode which prevents continuous job execution to be stored and executed by accumulation in a designated image forming apparatus. The present invention thereby solves an existing problem wherein specific mode jobs and other jobs are stored in intermingled fashion in an image forming apparatus and the execution of a specific mode job delays the execution of a job other than a specific mode job. The overall processing efficiency of a network is thereby improved, which is extremely beneficial particularly when any of several image forming apparatuses has a high frequency of use.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A device for selecting a network-connected image forming apparatus from a plurality of network-connected image forming apparatuses, where each of at least two of the plurality of image forming apparatuses has a specific mode, the device comprising:
   a controller for selecting one of the plurality of image forming apparatuses connected with the network,
   wherein when an input job has a specific mode, said controller selects an image forming apparatus which has a specific mode and which stores a prior job having the specific mode of the input job at the time the selection is made, and
   said controller for registering the input job in the selected image forming apparatus.

2. A device according to claim 1, wherein said selected image forming apparatus is adapted to form images of a job having the specific mode which requires temporarily stopping the selected image forming apparatus.

3. A device according to claim 2, wherein said selected image forming apparatus has a manual paper feeding specific mode.

4. A device according to claim 2, wherein said selected image forming apparatus is adapted to form an image of a job possessing the specific mode requiring changing paper positioned in the selected image forming apparatus.

5. A device according to claim 2, further comprising:
   notice means for notifying a user to place an indicated type of paper in the selected image forming apparatus.

6. A device according to claim 1, wherein said controller selects one of the plurality of image forming apparatuses not storing a job of the specific mode when the input job does not have the specific mode.

7. A device according to claim 1,
   wherein each of said plurality of image forming apparatuses has a memory for storing jobs, and
   wherein said controller selects an image forming apparatus not storing a job in the memory of the selected image forming apparatus when an image forming apparatus storing a job of the specific mode cannot be referenced.

8. A device according to claim 7, wherein said controller selects an image forming apparatus having a greater remaining memory than any other of the plurality of image forming apparatuses when an image forming apparatus not having a job stored in memory cannot be referenced.

9. A device according to claim 1, wherein when said input job has the specific mode where the specific mode indicates a requirement for a specific size paper,
   said controller receives information from the plurality of image forming apparatuses regarding a size of paper in each of the image forming apparatuses, and
   wherein, when no image forming apparatus contains the specific size paper, said controller selects as a selected image forming apparatus an image forming apparatus storing a job having a different specific mode and said controller registers said input job in the selected image forming apparatus.

10. A device according to claim 9, further comprising:
    notice means for notifying a user to place an indicated type of paper in the selected image forming apparatus.

11. A device according to claim 1, wherein the specific mode of the prior job stored in the image forming apparatus is a manual paper feeding mode.

12. An image forming apparatus connected with a job management device through a network, said image forming apparatus comprising:
    a memory for storing jobs;
    discriminating means for discriminating whether any jobs stored in the memory have a specific mode in order to determine a status of the memory; and
    reporting means for reporting the status of the memory to the job management device such that the job management device can determine whether or not to route an input job having a specific mode to the image forming apparatus based on whether any of the jobs stored in the memory has the specific mode of the input job.

13. An image forming apparatus according to claim 12, wherein said memory stores a job having the specific mode requiring temporary stoppage of the image forming apparatus.

14. An image forming apparatus according to claim 13, wherein said memory stores a job having the specific mode requiring a selected image forming apparatus having a manual paper feeding mode.

15. An image forming apparatus according to claim 13, wherein said memory stores a job having the specific mode requiring changing paper positioned in the selected image forming apparatus.

16. An image forming apparatus according to claim 13, further comprising:

image forming means for forming images on a recording medium in order of a sequence of jobs stored in said memory.

17. An image forming apparatus according to claim 12, wherein the specific mode of the prior job stored in the image forming apparatus is a manual paper feeding mode.

18. A network system comprising:

a network for transmitting data;

a plurality of image forming apparatuses connected with said network and each of the plurality of image forming apparatuses having a memory for storing jobs;

discriminating means for discriminating a status of the memory based on whether the memory stores a job having a specific mode;

reporting means for reporting to the network the status of the memory of any of the plurality of image forming apparatuses whose memory stores a job having a specific mode; and a control device for selecting one of said plurality of image forming apparatuses connected with the network and for registering an input job in the selected image forming apparatus, wherein when said input job has a specific mode, said control device selects an image forming apparatus whose memory stores a job having the specific mode of the input job.

19. A network system according to claim 18, wherein the specific mode of the prior job stored in the image forming apparatus is a manual paper feeding mode.

* * * * *